2,715,150
Patented Aug. 9, 1955

2,715,150

ELECTRIC STORAGE BATTERY

Carl Gritman, Sunland, Robert Broussard, Glendale, and Charles A. Toce, Sunland, Calif., and John H. Joynt, Alexandria, Va., assignors to Electro-Acid Corporation, a corporation of Texas No Drawing. Application April 28, 1953,
Serial No. 351,744

3 Claims. (Cl. 136—27)

Our invention relates generally to electric storage batteries, and more specifically concerns a storage battery of the well-known lead-sulphuric acid type.

An object of the invention is to provide an electric storage battery of the type described wherein the plates of the battery are effectively shielded against detrimental sulphation without imposing any serious interference upon either proper charge or discharge; wherein rate of both charge and discharge are importantly increased without harmful effect; which will permit long storage of the battery even with the battery plates in dry condition, thus facilitating ready shipping; and which will retain charge without appreciable loss during long standing idle and will not be damaged upon long standing in discharged condition.

Another object is to provide a battery of the type referred to wherein the addition of an improved electrolyte permits more rapid exchange of ions into and out of the battery plates without damage to the plate structure, and wherein long useful life is achieved with minimum cost when viewed from "total-life" aspect.

Other objects and advantages in part will be obvious and in part more fully pointed out hereinafter during the course of the following discussion.

Accordingly, our invention may be considered as residing in the several arrangements of parts, compositions of materials, and in the relation and combination of each of the same with one or more of the others, the scope of the application of all of which is more fully set forth in the accompanying claims.

As conducive to a more ready and thorough understanding of our invention it may be noted at this point that the common lead-sulphuric acid type of electric storage battery unfortunately is characterized by the phenomenon that the electrolyte commonly employed therein—dilute sulphuric acid—indirectly destroys the plates thereof, and importantly limits the maximum rates at which the battery can be charged or discharged without damage. Without the use of effective safeguards such as we disclose, any important increase in rate of either charge or discharge beyond the rather low rates thus imposed will almost inevitably result in either total destruction of the battery, or at least serious damage thereto, attended by a marked shortening of its useful life.

As is well known, the ordinary storage battery of the type described comprises a number of cells, each cell being made up of a plurality of plates alternately of sponge lead and lead oxide as the active constituents, the battery casing being filled with dilute sulphuric acid which when initially introduced and under full charge conditions has a specific gravity of about 1.275. When fully discharged the electrolyte is water with specific gravity of 1.000. The active materials of the plates have become essentially lead sulphate.

A battery that is permitted to stand idle in the discharged condition is subject to what is commonly termed sulphation. With the cycles of heating and cooling encountered in day to day atmospheric temperature changes the fine sulphate crystals are taken into solution, although the solubility of lead sulphate in water is very low, indeed, as the temperature increases and the dissolved sulphate precipitates out as the temperature falls. In coming out of solution the lead sulphate deposits on existing crystals thus making them larger. With long idle standing where temperature changes are met with larger crystals grow at the expense of the smaller ones, with the result that the lead sulphate becomes hard and compact. Porosity of the plates is decreased and so is the total surface area.

Sulphation is undesirable in that it slows up the current-producing functions of the battery. As well, by obstructing the movement of the electrolyte into and out of combination with the material of the plates, it slows up the rate of charging. The retarding action thus imparted effectively prevents charging the usual battery at a rate appreciably in excess of six amperes per cell. As well, discharge in excess of that rate is most undesirable, as has been suggested, for violation of that rule of thumb almost inevitable is accompanied by serious damage to the plates, either by buckling or by loss of material therefrom.

While many attempts have been made to provide batteries which display greater useful life while being subjected to accelerated charging and discharging conditions, and while attempts have been made to minimize excessive sulphation of the plates during use, for one reason or another most of these efforts have fallen short of success. And heretofore it has been virtually impossible, from a practical standpoint, to increase appreciably the rate of charge or of discharge without attendant damage to the battery. None of these prior proposals, so far as is known, has achieved the reward of public acceptance.

An important object of our invention, therefore, during the course of suppressing or effectively avoiding the many defects and disadvantages inherent in known storage batteries, is to provide such a battery having long useful life, which can be readily and rapidly charged and discharged at extremely high current rates without detrimental effect; which will retain its useful characteristics, even when idle over long periods of time; which can be transported readily and cheaply and even stored in dry condition; and which in short is nearly foolproof and involves low cost, both in initial construction, storage preparatory to use, and in active operation and maintenance, all with but little loss in active plate material.

In a typical instance involving the practice of our invention, we employ a battery casing of the usual acid resistant material, and having conventional configuration. In this casing we provide at least one plate with active ingredients essentially formed of lead dioxide and serving as the positive pole of the battery. At least one plate with active ingredients essentially comprising pure sponge lead serves as the negative pole.

Typically an electrolyte suitable for our purpose comprises: Sulphuric acid ($H_2SO_4$) ⅓ by volume and distilled water ($H_2O$) ⅔ by volume. To this we add a suitable and soluble tellurium compound, preferably of high oxygen content, and selected illustratively, from the group comprising: Telluric acid, tellurous acid, tellurium dibromide, tellurium di-chloride, tellurium tetrachloride, tellurium tetraiodide and tellurium oxychloride.

To each 100 gallons of the aqueous solution of sulphuric acid we add approximately one (1) pound of a suitable water-soluble tellurium-containing compound from the group noted. It will be observed that generally, the proportion by weight of the addition is of the order of 0.1%.

Typically, with the foregoing electrolyte in the battery case in which the lead dioxide plate or plates and the sponge lead plate or plates have been positioned, we first subject the battery to charging in the usual manner. However, we find that with our new electrolyte we can safely and advantageously employ charging currents as high as 100 amperes with absolutely no evidence of damage to the battery elements. And this is so, even when these latter are subjected to the most exhaustive tests. More particularly, it may be noted that although we do not pretend to know conclusively the exact nature of the chemical and electrochemical reactions involved incident to the charging and discharging, we find that a battery construction according to the practice of our invention can be safely subjected to a charging rate of more than 100 amperes for several hours without detrimental or excessive heating and without damage to the plates. Such phenomenon appreciably lowers the cost of initial activation of the batteries during manufacture. By contrast, it may be noted that such operational technique would almost inevitably bring about destruction of a similar battery using only the usual sulphuric acid electrolyte. Our new battery is equally adapted to discharge at similar high current densities.

At a later part of our specification, we suggest that with the use of our new electrolyte the battery, following complete discharge, may be emptied of electrolyte and thereafter transported and stored, without appreciable loss of charge. Upon restoration of distilled water, just prior to use, the battery may be charged and recaptures its original condition.

In the manufacture of the conventional battery the plates are positioned in the battery case, the case is then filled with the aqueous sulphuric acid electrolyte, and the battery is then charged. Because of local action in the battery, which takes the effect of discharging it somewhat, and sulphation as previously dealt with, rapid deterioration is encountered if the battery is not thereafter maintained in fully charged condition. This means that the manufacturer must maintain the battery supplied with electrolyte and must keep the battery charged by occassional recharging until sold. Shipment of these batteries is costly, due to weight of electrolyte. Moreover, such shipment is relatively hazardous, due to likelihood of breakage or spillage, with attendant and consequent damage to other shipments. Dry shipment is fraught with difficulty because it entails a special steam treatment of the plates to clean them and because, even then, the plates are inclined to sulphate in transit and in dry storage.

With our new battery, the battery may be subjected to an initial charge with the plates immersed in a dilute aqueous sulphuric acid solution, this at low charging rate. This first solution is then discarded, our new electrolyte is added, and the battery charged at high current rate, say 100 amperes, for about three and one-half hours in a typical instance. Following the completion of the charge, the battery is put on discharge and after full discharge the plates thereafter may be removed from the electrolyte, washed and dried.

To make the battery ready for use, it merely is necessary to place the plates in a battery case, add distilled water and charge it. A fully charged battery is thereby produced. The dry plates, either within or without the battery case, is not given to taking on moisture from the air. For some reason as yet unknown to us, the hygroscopic character of the plates is alleviated. The dry plates, while containing the components which, when placed in solution with and upon addition of water, will produce the acid electrolyte at proper strength, may nevertheless be handled freely and with the utmost safety by the bare hand while the plates are in dry condition. These plates feel rather glassy and not at all like the conventional untreated plates.

It is possible to ship the battery safely and in dry condition, and this with reduced cost and increased safety. It is equally feasible to ship the treated plates alone while in dry condition. And this present further savings in transportation costs, and with like increase in the safety potential. Once the battery is formed and charged, this charge will endure indefinitely without any substantial loss in effectiveness.

It is of course possible to vary the proportion of the soluble tellurium-containing additive to the electrolyte, depending not only upon the particular tellurium compound used but as well, ranging between certain permissible limits within the particular tellurium compound employed. Thus the proportion of tellurium compound to be added to the electrolyte may be varied between say, about 0.05% and 0.2% or higher by weight. We find, however, that a concentration of about 0.1% by weight gives satisfactory results.

As we have suggested at an earlier point herein, a further important advantage of our invention is the fact that the voltage per cell is somewhat increased from the usual 2 volt rating to something in the neighborhood of 2.2 volts. We attribute this at least in part to the fact that the objectionable growth of lead sulphate crystals during idle periods is materially lessened in the case of the new battery. This absence of sulphate lessens ohmic resistance to electron flow. As a result, the terminal voltage for each cell is somewhat increased.

We have not conclusively established as yet, however, whether the increased voltage is due in fact to decreased resistance to electron flow as suggested, or whether it results from increased flow of electrons attendant in some manner upon the addition to the electrolyte of the water-soluble tellurium-containing compound. It remains, however, and regardless of the exact reason—that when our new battery is placed into service the characteristic advantages which have been recited are achieved; namely ability to withstand effectively abnormally high rates of charging and discharging, ability to retain its charge without necessity for constantly replenishing the charge, and important savings in shipping costs with increased safety to other merchandise undergoing shipping.

It should be observed that while the mode of adding the water-soluble tellurium compound to the battery which at present we find to be most practicable is through the electrolyte, it is entirely within the realm of possibility to accomplish this in other manners. For illustratively, it may be applied as a coating to the interior walls of the casing; or to the surfaces of the battery plates. Or it may be included in the plate material, particularly in the lead peroxide plate.

It is our belief that in actual practice the tellurium ionizes out of solution and deposits onto the battery plates in an extremely thin, uniform layer, possibly as tellurium sulphate. In so doing it apparently penetrates into the very pores of the plates. Thereby it effectively shields the plates against sulphation, and lends physical strength to the active ingredients, while in no sense interfering with or preventing proper charge and discharge. Loss by local action and corrosion are minimized.

As has been developed hereinbefore in detailed manner, a battery produced according to the practice of our invention is extremely rugged and withstands both charging and discharging at extremely high current rates. The new electrolyte makes the resultant battery exceptionally resistant to shock and vibration and imparts long useful life thereto.

A storage battery of this type may be transported cheaply and inexpensively, without presence of electrolyte, and with consequent added safety to other merchandise in transit. Even after prolonged dry storage, the addition of distilled water and charging will fully activate the battery. All these as well as many other high practical advantages attend upon the practice of our invention.

It will be apparent from the foregoing that while we have described herein certain manners of carrying our invention into execution, these are purely illustrative. No implication results therefrom that our invention is to be limited to the exact form thus disclosed. It is to be understood that for proper protection, our invention is intended to, and covers all such reasonable modifications of the disclosed embodiments as properly fall within the scope of the appended claims.

We claim:

1. A storage battery electrolyte comprised of dilute sulphuric acid together with about 0.05% to 0.2% by weight of a water-soluble tellurium compound selected from the group consisting of telluric acid, tellurous acid, tellurium di-bromide, tellurium di-chloride, tellurium tetrachloride and tellurium tetra-iodide.

2. A storage battery comprising a casing, alternate plates of pure sponge lead and lead dioxide, and an electrolyte comprised of dilute sulphuric acid and about 0.05% to 0.2% of water-soluble tellurium-containing compound selected from the group consisting of telluric acid, tellurous acid, tellurium di-bromide, tellurium di-chloride, tellurium tetrachloride, tellurium tetra-iodide and tellurium oxychloride.

3. The method of manufacturing an electric storage battery comprising immersing sponge lead plates and lead dioxide plates in an electrolyte essentially containing aqueous sulphuric acid and a soluble tellurium compound, charging the same, then discharging the same to give plates essentially comprising lead sulphate with sufficient tellurium compound to prevent objectionable sulphation of the plates, removing the plates from the electrolyte and drying the same.

References Cited in the file of this patent

UNITED STATES PATENTS

| | | |
|---|---|---|
| 2,389,832 | Williams et al. | Nov. 27, 1945 |

FOREIGN PATENTS

| | | |
|---|---|---|
| 15,369 | Great Britain | Oct. 25, 1888 |
| 17,674 | Great Britain | of 1905 |

OTHER REFERENCES

Trans. Electrochemical Society, vol. 92, 1947, pp. 229–234.

Storage Batteries, by Vinal, 3rd edition, 1940, pp. 118–119.